United States Patent [19]

Wijn et al.

[11] Patent Number: 4,655,935
[45] Date of Patent: Apr. 7, 1987

[54] DETOXIFICATION OF WASTE WATER FROM DITHIOCARBAMATE MANUFACTURE

[75] Inventors: Jan A. Wijn, Hendrik Ido Ambacht; Peter Kool, Westvoorne, both of Netherlands

[73] Assignee: Pennwalt Corporation, Philadelphia, Pa.

[21] Appl. No.: 789,584

[22] Filed: Oct. 21, 1985

[51] Int. Cl.$^4$ ............................................. C02F 1/70
[52] U.S. Cl. ..................................... 210/750; 210/908; 210/916; 210/757
[58] Field of Search ............... 210/750, 718, 916, 908, 210/757; 562/555

[56] References Cited

U.S. PATENT DOCUMENTS 3,966,601  6/1976  Stevenson et al. .................. 210/727
4,465,593  8/1984  Wemhoff ............................ 210/96.1

*Primary Examiner*—Benoit Castel

[57] ABSTRACT

Waste water from the preparation of salts of dithiocarbamic acid is detoxified by acidifying the waste water to promote hydrolytic decomposition of organosulfur compounds, passing an inert gas through the acidified water to aid in expelling decomposition gases thereby increasing the decomposition rate, and, optionally, adjusting the pH of the resulting solution toward neutral.

11 Claims, No Drawings

DETOXIFICATION OF WASTE WATER FROM DITHIOCARBAMATE MANUFACTURE

BACKGROUND OF THE INVENTION

Certain metal salts of dithiocarbamic acid have found extensive commercial application and are manufactured in large quantities. A general characteristic of the known processes for the manufacture of these salts is the voluminous coproduction of waste water streams containing dithiocarbamates and sulfur-containing decomposition products thereof. Should this waste water be directly discharged into surface water, for example, lakes, rivers or streams, such waters may become toxic to fish.

Several methods of reducing the fish toxicity of industrial waste water from the manufacture of dithiocarbamates are known. In the method of precipitation of neutralized waste water with the aid of zinc or ferric ions, solids are produced which are difficult and costly to filter and dispose of. Oxidation processes for reducing fish toxicity of this waste water require the use of costly oxidizing agents and such processes also produce solid waste containing toxic material.

Increasing demands by governmental agencies and the public dictate the need to provide less costly and more effective methods to detoxify industrial waste water and to substantially decrease this form of environmental pollution.

STATEMENT OF THE INVENTION

This invention is a process for detoxifying waste water from the preparation of salts of dithiocarbamic acid comprising (i) acidifying said waste water to a pH ranging between about 2 and about 3, (ii) passing a gas through the acidified waste water at a rate sufficient to promote the expulsion of gases formed from the decomposition of the dithiocarbamic acid salt, and (iii), optionally, adjusting the pH of said waste water toward neutral. After the above treatment, the waste water may be discharged into sewage or surface water with substantially reduced environmental effect.

DETAILED DESCRIPTION OF THE INVENTION

The process of this invention provides an effective and advantageous alternate route to the reduction of fish toxicity of dithiocarbamate process waste waters by the hydrolytic decomposition of the dithiocarbamate and related organosulfur-containing products with an acid and the promotion of such hydrolytic decomposition by the rapid removal of sulfur-containing decomposition gases from the waste water whereby substantially no solid waste is produced.

The acid used to cause hydrolytic decomposition may be any acid which can be subsequently readily neutralized without introduction of undesirable ingredients and which will effectively reduce the pH of the waste water to the required range. Preferably, a mineral acid and, more preferably, hydrochloric or sulfuric acid is utilized. Strong organic acids, for example, formic, acetic or oxalic acid, can also be used.

The gas, which is passed through the acidified waste water to drive off decomposition gases, is any vapor which does not substantially change the pH of the waste water or react with a component of the waste water (or decomposition product) to form toxic material or solids. Inert, inorganic gases are preferred; most preferably, air or nitrogen is used. The gas is passed or blown through the acidified waste water at a rate which is sufficient to promote the expulsion of sulfur-containing decomposition gases, eg. carbon disulfide ($CS_2$) and hydrogen sulfide ($H_2S$), from the waste water thereby encouraging a more rapid and complete hydrolysis of the dithiocarbamate and related organosulfur material. In the case of air or oxygen, the gas must be blown through the waste water at a rate of sufficient intensity to avoid the formation of explosive mixtures with $CS_2$ and $H_2S$. This hazard does not occur with the use of nitrogen gas. The gas is preferably passed through the waste water in the batch process at a rate of about 30 times the volume of the waste water batch per hour. In the continuous process, the gas is passed through the waste water at the rate of about 7 to about 8 times the waste water volume rate.

The temperature of the process ranges from above the freezing point up to the boiling point of the waste water to be treated, preferably from room temperature to 100° C.

The treatment time for the process of this invention is that time required to reduce the fish toxicity of the waste water. The time of treatment in the batch method preferably ranges from about 10 minutes to about 2 hours, more preferably 15 to 30 minutes, depending on the rate of hydrolysis. The residence time for the waste water in the treatment zone in a continuous process will preferably range from about 30 minutes to 2 hours also depending on the rate of hydrolysis.

The decomposition gas expelled from the treated waste water is advantageously incinerated either directly or after being deposited on an absorbant material, eg., activated carbon.

The waste waters for the manufacture of salts of dithiocarbamic acid to be treated by the process of this invention are those which will benefit in reduced fish toxicity by such treatments. In particular, the waste waters from the formation or manufacture of sodium, potassium, ammonium, manganese, zinc, iron, nickel, cobalt, copper and lead salts of lower ($C_1$–$C_6$) alkyl dithiocarbamic acids or lower ($C_1$–$C_6$) alkylene bis dithiocarbamic acids as well as the double-salts, multi-salts and coordinated complex salts of the aforementioned metals in all combinations. As is well known in the art, the above-mentioned salts can be produced by the reaction of a water-soluble salt of dithiocarbamic acid with the soluble salt of one or more of the above-identified metals. The reaction products are formed by precipitation due to low aqueous solubility. The prepared metal dithiocarbamates are recovered from the aqueous media in which they are formed leaving waste waters which may be toxic to fish. It is preferred that the process of this invention be used with waste waters from the manufacture of manganese and zinc salts of lower alkylene bis dithiocarbamic acids and the manganese, zinc and iron salts of lower alkyl dithiocarbamic acids.

After treatment of the waste water is accomplished, it is generally necessary to adjust the acidity by bringing the pH of the waste water to neutral or closer to neutral before discharging. This can be done by conventional means, for example, by adding caustic soda or a similar inert basic substance to the water.

The following examples are set forth to demonstrate the process of this invention.

EXAMPLE 1

(a) Two liters of waste water from the manufacture of polymeric manganese ethylene bis (dithiocarbamate) in a three-liter flask equipped with a mechanical stirrer was acidified to a pH of 2.0 with sulfuric acid. After one hour of stirring and simultaneously blowing air at a rate of 60 liters per hour therethrough (30 times the volume of the waste water batch per hour), the waste water was neutralized with caustic soda. During treatment, the temperature was maintained at about room temperature (20° C.).

(b) The procedure of 1(a) was repeated except that the time of stirring and air blowing was reduced to 30 minutes.

(c) The procedure of 1(b) was repeated except that the temperature was raised to 40° C. during the treatment period.

(d) The procedure of 1(a) was repeated except that air was replaced with nitrogen in the blowing step.

The treated waste waters and the untreated waste water (control) of this example were subjected to a fish toxicity test with guppies (poecilia reticulata). This test consisted of exposing guppies to various concentrations of the (treated or untreated) waste waters. The "TLm 96 guppies" is defined for this test as the concentration that will kill 50% of the exposed guppies within 96 hours.

The results of the fish toxicity test for the treated waste waters of this example are set forth in the following table.

TABLE 1

| Example | TLm 96 guppies, vol. % | Improvement Factor |
|---|---|---|
| Control | 0.5 | — |
| 1(a) | 10.0 | 20 |
| 1(b) | 7.0 | 14 |
| 1(c) | 10.0 | 20 |
| 1(d) | 9.0 | 18 |

EXAMPLE 2

(a) Waste water from the manufacture of polymeric manganese ethylene bis(dithiocarbamate) was continuously charged to a 30-liter reactor at a rate of 30 liters per hour with the continuous draw-off of treated effluent at the same rate of 30 liters per hour (reactor residence time=1 hour). The acidity of the waste water in the reactor was maintained at a pH of 2.0 and the temperature of the water was kept at 40° C. by the addition of steam. Air was blown into the waste water being treated at the rate of 225 liters per hour (7.5 times the waste water volume rate per hour). After neutralizing the effluent from the reactor with caustic soda, it (effluent) was subjected to the fish toxicity test described in Example 1.

(b) The procedure of 2(a) was repeated except that the pH is maintained at a level of 2.5.

(c) The procedure of 2(a) was repeated except that no steam was added and the temperature of the waste water being treated was about room temperature (20° C.).

The results of the fish toxicity test (described in Example 1) for the treated waste waters is set forth in the following table.

TABLE 2

| Example | TLm 96 guppies, vol. % | Improvement Factor |
|---|---|---|
| Control | 0.5 | — |
| 2(a) | 12.0 | 24 |
| 2(b) | 8.0 | 16 |
| 2(c) | 5.0 | 10 |

EXAMPLE 3

(a) Two liters of waste water from the manufacture of zinc dimethyldithiocarbamate in a three-liter flask equipped with a mechanical stirrer was acidified to a pH of 2.0 with sulfuric acid. After one hour of stirring and simultaneously blowing air at a rate of 60 liters per hour therethrough (30 times the volume of the waste water batch per hour), the waste water was neutralized with caustic soda. During treatment, the temperature of the water was maintained at room temperature (20° C.). After neutralizing, the treated and untreated waste water was subjected to the fish toxicity test described in Example 1.

(b) The procedure of 3(a) was repeated except that steam was added to bring and maintain the treatment at 40° C.

The results of the fish toxicity test (described in Example 1) for the treated waste waters of this example is set forth in the following table.

TABLE 3

| Example | TLm 96 guppies, vol. % | Improvement Factor |
|---|---|---|
| Control | 0.5 | — |
| 3(a) | 5.0 | 10 |
| 3(b) | 7.0 | 14 |

EXAMPLE 4

(a) Two liters of waste water, from the manufacture of ferric dimethyldithiocarbamate, in a three-liter flask equipped with mechanical stirrer was acidified to a pH of 2.0 with sulfuric acid. After one hour of stirring and simultaneously blowing air at a rate of 60 liters per hour therethrough (30 times the volume of the waste water batch per hour), the waste water was neutralized with caustic soda.

During the treatment, the temperature of the water was maintained at room temperature (20° C.). After neutralizing, the treated and untreated water was subjected to the fish toxicity test described in Example 1.

(b) The procedure of 4(a) was repeated except that steam was added to bring and maintain the treatment temperature at 80° C.

The results of the fish toxicity test for the treated waste water is set forth in the following table.

TABLE 4

| Example | TLm 96 guppies vol. % | Improvement Factor |
|---|---|---|
| Control | 0.3 | — |
| 4(a) | 0.9 | 3 |
| 4(b) | 3.0 | 10 |

The fish toxicity test results shown in the foregoing tables demonstrate the ability of the process of this invention to detoxify waste waters from the manufacture of salts of dithiocarbamic acids. The process is advantageously flexible since the process parameters, ie., acidity, temperature and time, may be interdependently adjusted to meet various plant requirements.

We claim:

1. A process for detoxifying waste water containing dithiocarbamates and sulfur-containing decomposition products thereof from the manufacture of salts of dithiocarbamic acid comprising (i) acidifying said waste water to a pH ranging between about 2 and about 3, and (ii) passing a gas through the acidified waste water at a rate sufficient to promote expulsion of gases formed from the decomposition of the dithiocarbamic acid salt.

2. The process of claim 1 wherein acidification is caused by the addition of a mineral acid to said waste water.

3. The process of claim 2 wherein said mineral acid is hydrochloric or sulfuric acid.

4. The process of claim 3 wherein the gas is air or nitrogen.

5. The process of claim 1 wherein the gas is air or nitrogen.

6. The process of claim 1 wherein the salts comprise manganese, zinc, iron, mixtures thereof or coordination complexes thereof.

7. The process of claim 6 wherein the acidification is caused by the addition of hydrochloric or sulfuric acid to said waste water and the gas is air or nitrogen.

8. The process of claim 7 further comprising adjusting the pH of the gas-treated waste water toward neutral.

9. The process of claim 7 wherein the process is a batch process and the gas is passed through the waste water at the rate of about 30 times the volume of the waste water batch per hour and the process is operated for from about 10 minutes to about one hour.

10. The process of claim 7 wherein the process is a continuous process and the gas is passed through the waste water at the rate of about 7 to about 8 times the waste water volume rate and the residence time of the waste water in the treatment zone is between about 30 minutes and about 2 hours.

11. The process of claim 1 further comprising adjusting the pH of the gas-treated waste water toward neutral.

* * * * *